US012728390B2

(12) United States Patent
Yamamoto

(10) Patent No.: US 12,728,390 B2
(45) Date of Patent: Sep. 8, 2026

(54) WATER TREATMENT METHOD AND WATER TREATMENT AGENT COMPOSITION

(71) Applicant: ORGANO CORPORATION, Tokyo (JP)

(72) Inventor: Shohei Yamamoto, Tokyo (JP)

(73) Assignee: ORGANO CORPORATION, Tokyo (JP)

(*) Notice: Subject to any disclaimer, the term of this patent is extended or adjusted under 35 U.S.C. 154(b) by 323 days.

(21) Appl. No.: 18/280,056

(22) PCT Filed: Feb. 22, 2022

(86) PCT No.: PCT/JP2022/007345
§ 371 (c)(1),
(2) Date: Sep. 1, 2023

(87) PCT Pub. No.: WO2022/186013
PCT Pub. Date: Sep. 9, 2022

(65) Prior Publication Data

US 2024/0139682 A1 May 2, 2024

(30) Foreign Application Priority Data

Mar. 5, 2021 (JP) ................................ 2021-035669
Mar. 5, 2021 (JP) ................................ 2021-035671
Feb. 21, 2022 (JP) ................................ 2022-024870

(51) Int. Cl.
*B01D 61/02* (2006.01)
*B01D 61/04* (2006.01)
(Continued)

(52) U.S. Cl.
CPC ........... *B01D 61/04* (2013.01); *B01D 61/025* (2013.01); *B01D 61/12* (2013.01); *B01D 65/08* (2013.01);
(Continued)

(58) Field of Classification Search
CPC ........ C02F 1/50; C02F 1/766; C02F 2303/20; B01D 61/04; B01D 65/08
See application file for complete search history.

(56) References Cited

U.S. PATENT DOCUMENTS 4,278,548 A 7/1981 Bettinger et al.
5,919,374 A 7/1999 Harvey et al.
(Continued)

FOREIGN PATENT DOCUMENTS

CN 1259107 A 7/2000
CN 103300064 A 9/2013
(Continued)

OTHER PUBLICATIONS

Hiroshi Yoshikawa et al—CN 107635652 A machine translation—Jan. 26, 2018 (Year: 2018).*
(Continued)

*Primary Examiner* — Bradley R Spies
(74) *Attorney, Agent, or Firm* — Greenblum & Bernstein, P.L.C.

(57) ABSTRACT

Provided is a water treatment method with which, in a reverse osmosis membrane treatment conducted on water being treated that contains chlorine-based oxidants and/or bromine-based oxidants, or on water being treated that contains iodide ions, it is possible to suppress any deterioration in a reverse osmosis membrane and to suppress the formation of slime. This water treatment method includes a reverse osmosis membrane treatment, the water treatment method involving: adding, to water being treated that contains chlorine-based oxidants and/or bromine-based oxidants, 1 mol or more of iodide ions per mole of the free chlorine content and free bromine content of the water being treated; or adding, to water being treated that contains iodide ions, a chlorine-based oxidant and/or a bromine-based oxidant such that the free chlorine content and free bromine
(Continued)

content reach 1 mol or less per mole of iodide ions in the water being treated.

8 Claims, 5 Drawing Sheets

(51) Int. Cl.

| | |
|---|---|
| ***B01D 61/12*** | (2006.01) |
| ***B01D 65/08*** | (2006.01) |
| ***C02F 1/00*** | (2023.01) |
| ***C02F 1/44*** | (2023.01) |
| ***C02F 1/70*** | (2023.01) |
| ***C02F 1/76*** | (2023.01) |

(52) U.S. Cl.

CPC .............. *C02F 1/008* (2013.01); *C02F 1/441* (2013.01); *C02F 1/70* (2013.01); *C02F 1/766* (2013.01); *B01D 2311/04* (2013.01); *B01D 2317/02* (2013.01); *B01D 2321/167* (2022.08); *C02F 2301/08* (2013.01); *C02F 2303/20* (2013.01)

(56) References Cited

U.S. PATENT DOCUMENTS

| | | | |
|---|---|---|---|
| 6,120,812 | A | 9/2000 | Harvey et al. |
| 6,139,731 | A | 10/2000 | Harvey et al. |

FOREIGN PATENT DOCUMENTS

| | | | |
|---|---|---|---|
| CN | 107635652 | A | 1/2018 |
| CN | 109890764 | A | 6/2019 |
| JP | 56-33009 | A | 4/1981 |
| JP | 2003-183169 | A | 7/2003 |
| JP | 2004-210701 | A | 7/2004 |
| JP | 2006-88095 | A | 4/2006 |
| JP | 2006-232662 | A | 9/2006 |
| JP | 2010-271141 | A | 12/2010 |
| JP | 2014-129978 | A | 7/2014 |
| JP | 2015-186773 | A | 10/2015 |
| JP | 2015-186774 | A | 10/2015 |
| JP | 2018-8182 | A | 1/2018 |
| JP | 2020-37059 | A | 3/2020 |
| JP | 2020-163354 | A | 10/2020 |
| WO | 2016/136304 | A1 | 9/2016 |

OTHER PUBLICATIONS

Yasuhara Yoshiharu et al—JP 2004210701 A machine translation—Jul. 29, 2004 (Year: 2004).*

Sugawara Yuichi et al—JP 2015186774 A machine translation—Oct. 29, 2015 (Year: 2015).*

Ito Masayo et al—JP 2020163354 A machine translation—Oct. 8, 2020 (Year: 2020).*

Office Action, dated May 21, 2025, in Chinese family member application No. 202280016887.6 with English language translation thereof.

Office Action, dated May 27, 2025, in Japanese family member application No. 2021-035671, with English language translation thereof.

Office Action, dated Jan. 21, 2025, issued in Japanese family member application No. 2021-035671 with English language translation thereof.

International Search Report issued Apr. 26, 2022 in International Bureau of WIPO Patent Application No. PCT/JP2022/007345, with an English translation thereof.

International Preliminary Report on Patentability issued Aug. 29, 2023 in International Bureau of WIPO Patent Application No. PCT/JP2022/007345, with an English translation thereof.

Office Action, dated Jan. 6, 2026, that issued in corresponding Japanese Application No. 2022-024870, along with English language translation thereof.

Office Action, dated Nov. 13, 2025, that issued in corresponding Korean Application No. 10-2023-7028945 with English language translation thereof.

Office Action, dated Nov. 5, 2025, that issued in corresponding Taiwanese Application No. 111107439 with English language translation thereof.

* cited by examiner

WATER TREATMENT METHOD AND WATER TREATMENT AGENT COMPOSITION

CROSS REFERENCE TO RELATED APPLICATION

This application is a National Stage of International Application No. PCT/JP2022/007345 filed on Feb. 22, 2022, and claims priority to Japanese Patent Application No. 2021-035669 filed on Mar. 5, 2021, Japanese Patent Application No. 2021-035671 filed on Mar. 5, 2021, and Japanese Patent Application No. 2022-024870 filed on Feb. 21, 2022, which are incorporated herein by reference in their entirety including the specification, claims, drawings, and abstract.

TECHNICAL FIELD

The present invention relates to a water treatment method, and a water treatment agent composition that is used in that water treatment method.

BACKGROUND

Reverse osmosis membrane treatments using a reverse osmosis membrane are used in may processes such as pure water production, wastewater recovery and seawater desalination, and against the backdrop of water shortages of recent years, examples of the application of reverse osmosis membrane treatments to wastewater recovery applications have increased significantly. Reverse osmosis membrane treatments are generally applied following a pretreatment step such as a sand filtration or membrane filtration treatment, and a chlorine-based oxidizing agent such as hypochlorous acid is usually used to suppress slime formation caused by microbe proliferation in the pretreatment step, but if the chlorine-based oxidizing agent such as hypochlorous acid flows through to the reverse osmosis membrane, marked degradation of the membrane performance occurs, and therefore a reducing agent is added to the water supplied to the reverse osmosis membrane to decompose the hypochlorous acid or the like and suppress degradation of the reverse osmosis membrane.

However, if a water that has a reduced suppression effect on slime formation due to the addition of a reducing agent is supplied to a reverse osmosis membrane, then microbes can proliferate on the membrane surface causing biofouling, which can sometimes cause trouble such as a reduction in the permeate volume or an increase in the supply pressure.

For that reason, an antibacterial agent (slime control agent) that is less likely to cause membrane degradation of the reverse osmosis membrane, such as a stabilized chlorine compound such as chloramine or chlorosulfamic acid, or a stabilized hypobromous acid composition containing a bromine-based oxidizing agent such as bromine and sulfamic acid, is added to the reverse osmosis membrane supply water containing the added reducing agent to inhibit biofouling.

However, a problem arises in that if the amount added of the reducing agent is excessive, then the antibacterial agent may be reduced and consumed by the reducing agent, resulting in increases in the amounts of reagent added and the associated chemical costs, whereas if the amount added of the reducing agent is too low, residual hypochlorous acid or the like tends to cause membrane degradation.

For example, Patent Document 1 discloses that in a reverse osmosis membrane treatment, by adding sodium metabisulfite as a reducing agent to a water to be treated containing added sodium hypochlorite prior to a reverse osmosis membrane treatment, and also adding potassium iodide to generate iodine, microbe contamination can be suppressed.

However, no clear description is provided regarding the amount of potassium iodide necessary for the hypochlorous acid or the like, and if the amount added of the potassium iodide is too low, then there is a possibility that hypochlorous acid that has not been reduced may cause degradation of the reverse osmosis membrane, whereas if the amount added of the potassium iodide is excessive, then the chemical costs may increase.

On the other hand, iodide aqueous solutions prepared by dissolving a iodide salt in water are used as washing solutions or etching solutions in the production of polarizing plates, as analysis reagents for quantifying all manner of substances, as reducing agents for residual chlorine in waters to be treated such as tap water, and as antibacterial agents in water treatments and the like.

It is known that iodide aqueous solutions, upon exposure to the air, oxidize and release free iodine. Because iodine has sublimability and corrosive properties, the material for the storage container for the iodide aqueous solution needs to be an expensive material. Further, because iodine has oxidizing power, when an iodide aqueous solution is used for reducing residual chlorine in a water to be treated, the expected reducing power can sometimes not be achieved. For these types of reasons, it is necessary to suppress the release of free iodine in the iodide aqueous solution.

In Patent Document 2, the examples disclose that a 1 N sodium hydroxide aqueous solution containing 5% by weight of potassium iodide remains colorless after one week at room temperature.

Further, Patent Document 3 discloses that by adding an alkali compound to adjust the pH of a solution containing at least one substance selected from the group consisting of simple iodine, compounds containing the iodine element, iodide ions, and ions containing the iodine element in a concentration of less than 10% by mass, the release of iodine into the air upon evaporation and concentration can be suppressed.

However, in all of the iodide aqueous solutions disclosed in Patent Documents 2 and 3, the amount of the iodide salt in the iodide aqueous solution is low, and no method is disclosed for suppressing the release of free iodine in those cases where the concentration of the iodide aqueous solution is high. If the amount of the iodide salt in the iodide aqueous solution is low, then when used, for example, in a water treatment, a large amount of the iodide aqueous solution may become necessary, and increases in transport costs, storage costs and production costs associated with this increase in the amount used of the iodide aqueous solution may be a concern. Accordingly, a water treatment agent composition that is a high-concentration iodide aqueous solution for which the release of free iodine is suppressed would be very desirable.

CITATION LIST

Patent Literature

Patent Document 1: JP S56-033009 A
Patent Document 2: JP 2010-271141 A
Patent Document 3: JP 2006-232662 A

SUMMARY

Technical Problem

Objects of the present invention are to provide a water treatment method which, in a reverse osmosis membrane treatment of a water to be treated containing iodide ions or at least one of a chlorine-based oxidizing agent and a bromine-based oxidizing agent, is able to suppress degradation of the reverse osmosis membrane and also suppress slime formation, and also to provide a water treatment agent composition that is used in the water treatment method.

Further, another object of the present invention is to provide a water treatment agent composition containing a high concentration of an iodide salt but for which the release of free iodine is suppressed.

Solution to Problem

The present invention provides a water treatment method that includes a reverse osmosis membrane treatment step of treating a water to be treated using a reverse osmosis membrane to obtain a concentrate and a permeate, the method including either adding, to a water to be treated containing at least one of a chlorine-based oxidizing agent and a bromine-based oxidizing agent, at least 1 mol of iodide ions per 1 mol of the free chlorine content and free bromine content in the water to be treated, or adding, to a water to be treated containing iodide ions, at least one of a chlorine-based oxidizing agent and a bromine-based oxidizing agent in such an amount that the free chlorine content and free bromine content does not reach more than 1 mol per 1 mol of the iodide ions in the water to be treated.

In the water treatment method described above, in the case where the iodide ions are added to the water to be treated containing at least one of the chlorine-based oxidizing agent and the bromine-based oxidizing agent, the free iodine CT value, represented by the free iodine concentration (mg/L) produced in the water to be treated containing the added iodide ions×the iodide ion addition time (h), is preferably not more than 1.25 (mg/L·h).

In the water treatment method described above, in the case where at least one of the chlorine-based oxidizing agent and the bromine-based oxidizing agent is added to the water to be treated containing iodide ions, the free iodine CT value, represented by the free iodine concentration (mg/L) produced in the water to be treated to which at least one of the chlorine-based oxidizing agent and the bromine-based oxidizing agent has been added×the addition time (h) for at least one of the chlorine-based oxidizing agent and the bromine-based oxidizing agent, is preferably not more than 1.25 (mg/L·h).

In the water treatment method described above, in the case where the iodide ions are added to the water to be treated containing at least one of the chlorine-based oxidizing agent and the bromine-based oxidizing agent, the time from addition of the iodide ions until reaching the reverse osmosis membrane is preferably set to at least 15 seconds.

The present invention also provides a water treatment method that includes a membrane filtration treatment step of subjecting a water to be treated to a membrane filtration treatment using a separation membrane, and a reverse osmosis membrane treatment step of treating the membrane filtration treated water obtained in the membrane filtration treatment step using a reverse osmosis membrane to obtain a concentrate and a permeate, the method including either adding, to the water to be treated from the membrane filtration treatment step containing at least one of a chlorine-based oxidizing agent and a bromine-based oxidizing agent, at least 1 mol of iodide ions per 1 mol of the free chlorine content and free bromine content in the water to be treated, or adding, to the water to be treated from the membrane filtration treatment step containing iodide ions, at least one of a chlorine-based oxidizing agent and a bromine-based oxidizing agent in such an amount that the free chlorine content and free bromine content does not reach more than 1 mol per 1 mol of the iodide ions in the water to be treated.

In the water treatment method described above, in the case where the iodide ions are added to the water to be treated containing at least one of the chlorine-based oxidizing agent and the bromine-based oxidizing agent, the free iodine CT value, represented by the free iodine concentration (mg/L) produced in the water to be treated containing the added iodide ions×the iodide ion addition time (h), is preferably not more than 1.25 (mg/L·h).

In the water treatment method described above, in the case where at least one of the chlorine-based oxidizing agent and the bromine-based oxidizing agent is added to the water to be treated containing iodide ions, the free iodine CT value, represented by the free iodine concentration (mg/L) produced in the water to be treated to which at least one of the chlorine-based oxidizing agent and the bromine-based oxidizing agent has been added×the addition time (h) for at least one of the chlorine-based oxidizing agent and the bromine-based oxidizing agent, is preferably not more than 1.25 (mg/L·h).

In the water treatment method described above, in the case where the iodide ions are added to the water to be treated containing at least one of the chlorine-based oxidizing agent and the bromine-based oxidizing agent, the time from addition of the iodide ions until reaching the reverse osmosis membrane is preferably set to at least 15 seconds.

In the water treatment method described above, in the case where the iodide ions are added to the water to be treated containing at least one of the chlorine-based oxidizing agent and the bromine-based oxidizing agent, the region from the location of the addition of the iodide ions through to the reverse osmosis membrane treatment step is preferably operated as a closed system.

In the water treatment method described above, in the case where the iodide ions are added to the water to be treated containing at least one of the chlorine-based oxidizing agent and the bromine-based oxidizing agent, the amount added of the iodide ions is preferably controlled so that the oxidation-reduction potential of the water to be treated following addition of the iodide ions is not more than 550 mV.

The present invention also provides a water treatment agent composition that is used in the water treatment method described above, and contains water and an iodide salt.

The water treatment agent composition described above preferably also contains iodine.

In the water treatment agent composition described above, the amount of the iodide salt in the water treatment agent composition, expressed as an amount of iodide ions, is preferably at least 20% by mass, and the pH of the water treatment agent composition is preferably at least as large as the value calculated using formula (1) shown below.

$$pH=5.24\times\log(\text{amount of iodide ions (\% by mass)})-8.27 \quad (1)$$

The water treatment agent composition preferably also contains an alkali agent.

In the water treatment agent composition described above, the alkali agent is preferably a hydroxide.

In the water treatment agent composition described above, the TOC of the water treatment agent composition is preferably not more than 10 mg/L.

Advantageous Effects of Invention

The present invention is able to provide a water treatment method which, in a reverse osmosis membrane treatment of a water to be treated containing iodide ions or at least one of a chlorine-based oxidizing agent and a bromine-based oxidizing agent, is able to suppress degradation of the reverse osmosis membrane and also suppress slime formation, and also provide a water treatment agent composition that is used in the water treatment method.

The present invention is also able to provide a water treatment agent composition containing a high concentration of an iodide salt but for which the release of free iodine is suppressed.

DESCRIPTION OF EMBODIMENTS

Embodiments of the present invention are described below. These embodiments are merely examples of implementing the present invention, and the present invention is not limited to these embodiments.

Figure 1:
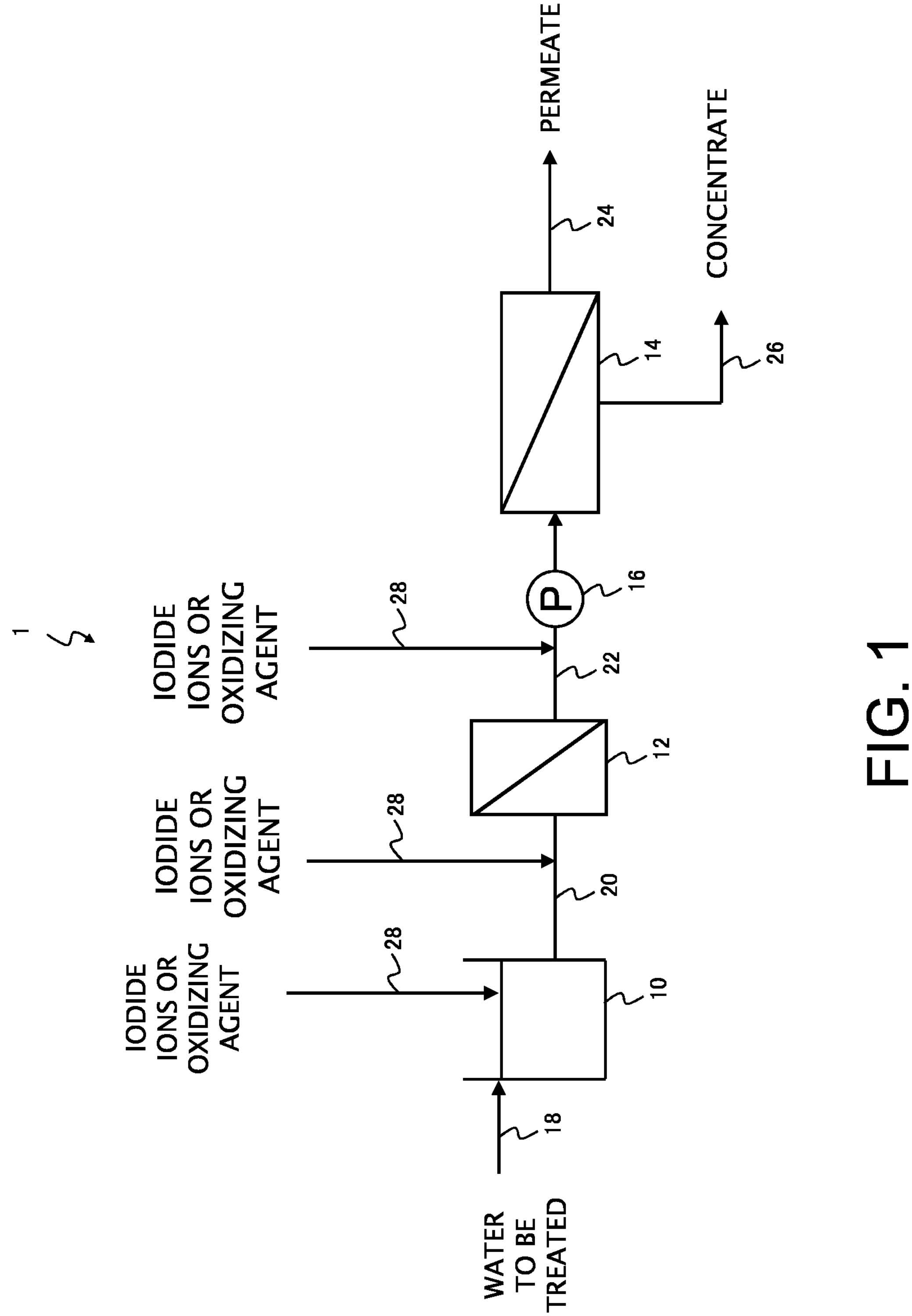
FIG. 1 is a schematic structural diagram illustrating one example of a water treatment device for implementing the water treatment method according to an embodiment of the present invention.

An outline of one example of a water treatment device for implementing the water treatment method according to an embodiment of the present invention is illustrated in FIG. 1.

The water treatment device 1 includes a reverse osmosis membrane device 14 as a reverse osmosis membrane treatment unit for treating either a water to be treated containing at least one of a chlorine-based oxidizing agent and a bromine-based oxidizing agent, or a water to be treated containing iodide ions, using a reverse osmosis membrane to obtain a concentrate and a permeate. The water treatment device 1 may also include a water to be treated tank 10 for storing the water to be treated. The water treatment device 1 may also include, at a stage prior to the reverse osmosis membrane device 14, a membrane filtration device 12 as a membrane filtration unit for subjecting the water to be treated containing at least one of a chlorine-based oxidizing agent and a bromine-based oxidizing agent, or the water to be treated containing iodide ions, to a membrane filtration treatment using a separation membrane.

Figure 2:
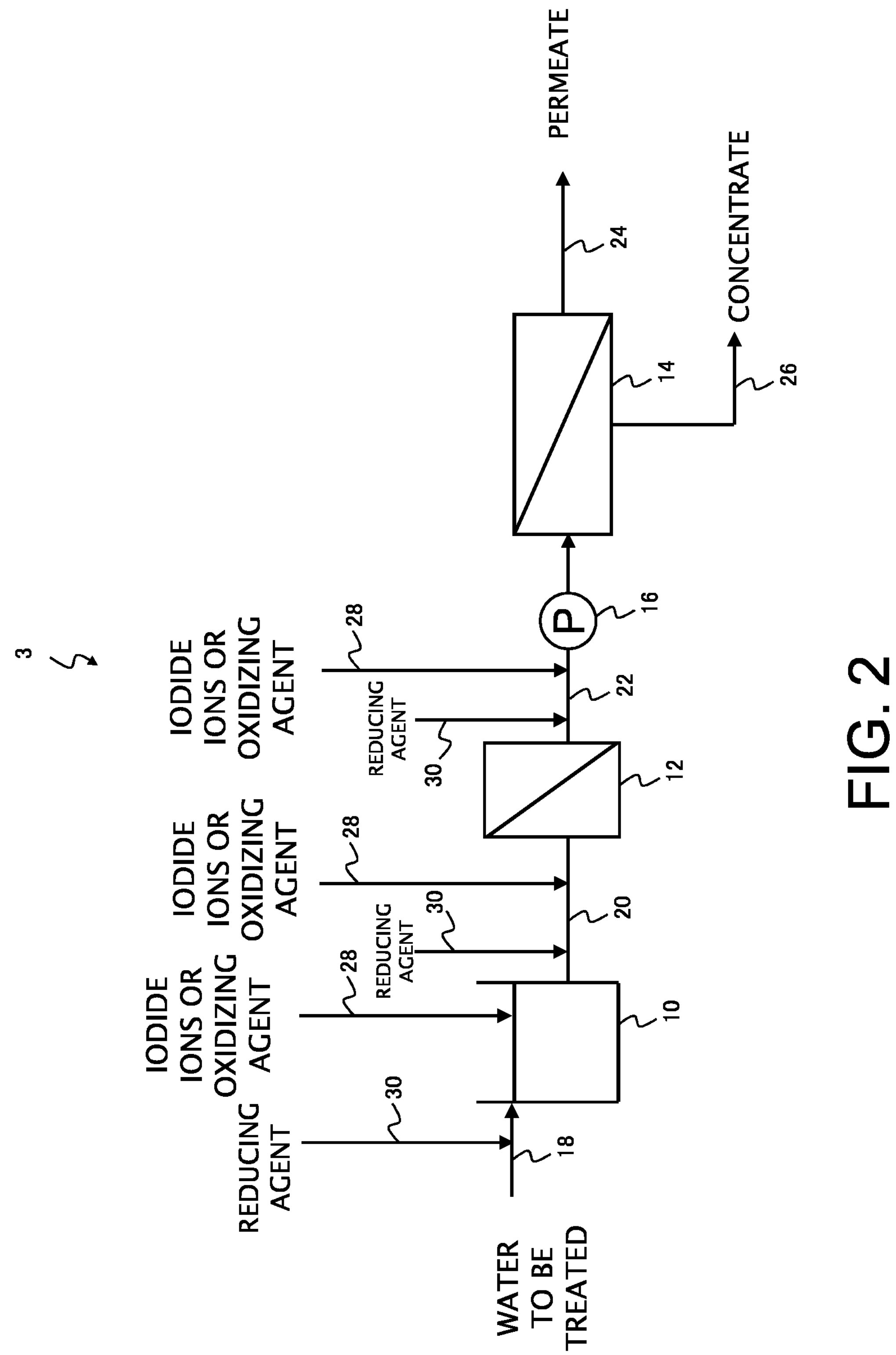
FIG. 2 is a schematic structural diagram illustrating another example of a water treatment device for implementing the water treatment method according to an embodiment of the present invention.

In the water treatment device 1 of FIG. 1, a water to be treated line 18 is connected to a water to be treated inlet of the water to be treated tank 10. A water to be treated outlet of the water to be treated tank 10 and a water to be treated inlet of the membrane filtration treatment device 12 are connected by a water to be treated line 20. A membrane filtration treated water outlet of the membrane filtration device 12 and a membrane filtration treated water inlet of the reverse osmosis membrane device 14 are connected by a membrane filtration treated water line 22 via a pump 16. A permeate line 24 is connected to a permeate outlet of the reverse osmosis membrane device 14, and a concentrate line 26 is connected to a concentrate outlet. An addition line 28 may be connected to at least one of a chemical reagent inlet of the water to be treated tank 10, the water to be treated line 20, and the membrane filtration treated water line 22, as either an iodide ion addition unit for adding iodide ions, or an oxidizing agent addition unit for adding at least one of a chlorine-based oxidizing agent and a bromine-based oxidizing agent. As illustrated in FIG. 2, a reducing agent addition line 30 may be connected to at least one of the water to be treated line 18, the water to be treated line 20, and the membrane filtration treated water line 22, as a reducing agent addition unit for adding a reducing agent.

The water treatment method and water treatment device 1 according to embodiments of the present invention are described below.

In the water treatment device 1 of FIG. 1, the water to be treated containing at least one of a chlorine-based oxidizing agent and a bromine-based oxidizing agent, or the water to be treated containing iodide ions, passes through the water to be treated line 18, and following storage in the water to be treated tank 10 where necessary, is passed through the water to be treated line 20 and fed into the membrane filtration device 12. In the membrane filtration device 12, a membrane filtration treatment of the water to be treated is conducted using a separation membrane (a membrane filtration treatment step). The membrane filtration treated water obtained in the membrane filtration treatment step is passed through the membrane filtration treated water line 22 and fed into the reverse osmosis membrane device 14. In the reverse osmosis membrane device 14, the membrane filtration treated water is subjected to a reverse osmosis membrane treatment using a reverse osmosis membrane to obtain a permeate and a concentrate (a reverse osmosis membrane treatment step). The permeate is discharged through the permeate line 24, and the concentrate is discharged through the concentrate line 26.

In the case where the water treatment device 1 does not include the membrane filtration device 12, the water to be treated containing at least one of a chlorine-based oxidizing agent and a bromine-based oxidizing agent, or the water to be treated containing iodide ions, is fed into the reverse osmosis membrane device 14, and in the reverse osmosis membrane device 14, the water to be treated is subjected to a reverse osmosis membrane treatment using a reverse osmosis membrane to obtain a permeate and a concentrate (a reverse osmosis membrane treatment step).

In the water treatment method and the water treatment device 1 according to embodiments of the present invention, in the case where the water treatment device 1 includes the membrane filtration device 12, and the membrane filtration treatment step is conducted, for each 1 mol of the free chlorine content and free bromine content in the water to be treated in the membrane filtration treatment step that contains at least one of a chlorine-based oxidizing agent and a bromine-based oxidizing agent, at least 1 mol of iodide ions is added through the addition line 28 to the water to be treated (an iodide ion addition step). In the case where the water treatment device 1 does not include the membrane filtration device 12, for each 1 mol of the free chlorine content and free bromine content in the water to be treated in the reverse osmosis membrane treatment step that contains at least one of a chlorine-based oxidizing agent and a bromine-based oxidizing agent, at least 1 mol of iodide ions is added through the addition line 28 to the water to be treated (an iodide ion addition step). In this description, "at least one of a chlorine-based oxidizing agent and a bromine-based oxidizing agent" is sometimes simply described using the expression "a chlorine-based oxidizing agent or the like".

Alternatively, in the case where the water treatment device 1 includes the membrane filtration device 12, and the membrane filtration treatment step is conducted, for each 1 mol of iodide ions in the water to be treated in the membrane filtration treatment step that contains iodide ions, at least one of a chlorine-based oxidizing agent and a bromine-based oxidizing agent is added through the addition line 28 in such an amount that the free chlorine content and free bromine content does not reach more than 1 mol (an oxidizing agent addition step). In the case where the water treatment device 1 does not include the membrane filtration device 12, for each 1 mol of iodide ions in the water to be treated in the reverse osmosis membrane treatment step that contains iodide ions, at least one of a chlorine-based oxidizing agent and a bromine-based oxidizing agent is added through the addition line 28 in such an amount that the free chlorine content and free bromine content does not reach more than 1 mol (an oxidizing agent addition step).

By adding iodide ions to the water to be treated in the reverse osmosis membrane treatment that contains a chlorine-based oxidizing agent or the like, the chlorine-based oxidizing agent or the like which can cause degradation of the reverse osmosis membrane can be reduced. The chlorine-based oxidizing agent or the like oxidizes the iodine ions to form iodine having sterilizing power, thereby converting the iodide ions into a slime inhibitor that inhibits slime formation while causing almost no degradation of the reverse osmosis membrane. As a result, by adding iodide ions to the water to be treated containing the chlorine-based oxidizing agent or the like, degradation of the reverse osmosis membrane can be suppressed, and slime formation can also be suppressed.

Further, by adding the chlorine-based oxidizing agent or the like to the water to be treated by the reverse osmosis membrane treatment that contains iodide ions, the chlorine-based oxidizing agent or the like oxidizes the iodine ions to form iodine having sterilizing power, thereby converting the iodide ions into a slime inhibitor that inhibits slime formation while causing almost no degradation of the reverse osmosis membrane. The chlorine-based oxidizing agent or the like which can cause degradation of the reverse osmosis membrane is reduced by the iodide ions. As a result, by adding the chlorine-based oxidizing agent or the like to the water to be treated containing iodide ions, degradation of the reverse osmosis membrane can be suppressed, and slime formation can also be suppressed.

The location at which the iodide ions are added to the water to be treated containing the chlorine-based oxidizing agent or the like, or the location at which the chlorine-based oxidizing agent or the like is added to the water to be treated containing iodide ions, may be any one of the water to be treated tank 10, the water to be treated line 20 upstream from the membrane filtration device 12, and the membrane filtration treated water line 22 downstream from the membrane filtration device 12. In terms of factors such as suppressing degradation of the membrane filtration device 12 by the chlorine-based oxidizing agent or the like, the iodide ions or chlorine-based oxidizing agent or the like is preferably added to the water to be treated in the membrane filtration treatment step, namely, either to the water to be treated tank 10, or to the water to be treated line 20 upstream from the membrane filtration device 12.

The chlorine-based oxidizing agent or bromine-based oxidizing agent may be any oxidizing agent having an oxidation-reduction potential (ORP) higher than that of iodine, and although similar effects can be achieved with combined chlorine or a stabilized hypobromous acid composition containing a sulfamic acid compound and a bromine-based oxidizing agent such as bromine, in terms of reaction speed and the like, oxidizing agents in a form that can be detected as free chlorine are preferred, with representative examples of these oxidizing agents having a form that can be detected as free chlorine including hypochlorous acid, hypobromous acid, and salts of these acids.

The concentration of the at least one of a chlorine-based oxidizing agent and a bromine-based oxidizing agent within the water to be treated containing the chlorine-based oxidizing agent or the like is, for example, within a range from 0.05 to 10 mg/L. The iodide ion concentration within the water to be treated containing iodide ions is, for example, within a range from 0.01 to 40 mg/L.

In this description, the oxidizing power of the oxidizing agent is represented by as the total chlorine or free chlorine determined by the DPD method. In this description, the term "total chlorine" refers to a concentration determined by absorption spectrophotometry using N,N-diethyl-p-phenylenediammonium sulfate (DPD) as disclosed in section 33 "Residual Chlorine" in JIS K 0120:2013. In one example, 2.5 mL of a 0.2 mol/L potassium dihydrogen phosphate solution is placed in a 50 mL colorimetric tube, 0.5 g of a dilute powder of DPD (prepared by crushing 1.0 g of N,N-diethyl-p-phenylenediammonium sulfate and then mixing the powder with 24 g of sodium sulfate) is added, 0.5 g of potassium iodide is added, an appropriate amount of the sample is added, water is then added to bring the volume up to the marked line and dissolve the mixture, and the resulting solution is left to stand for about three minutes. The absorbance of the resulting pink to pinky red color is measured near a wavelength of 510 nm (or 555 nm) and used to quantify the oxidizing agent. Furthermore, in this description, the term "free chlorine" refers to the oxidizing power of the oxidizing agent determined by conducting a measurement in the above "total chlorine" measurement method without adding the potassium iodide.

The DPD is oxidized by oxidizing agents, and examples of oxidizing agents that can be measured include chlorine, bromine, iodine, hydrogen peroxide, and ozone and the like. Chlorine forms that are quantified as total chlorine include all forms having oxidizing power, including hypochlorous acid, hypochlorite ions, chlorine, and combined chlorine such as chloramine and dichloroamine. In a similar manner, all forms of bromine or iodine that have oxidizing power can be measured. Substances that are quantified as free chlorine include all forms that can be measured in the above "total chlorine" measurement method without adding the potassium iodide, and examples include hypochlorous acid, hypobromous acid, chlorine, bromine and iodine.

Further, “total chlorine” can be converted to “total iodine”. Specifically, a conversion may be made based on the “molecular weight of chlorine” and the “molecular weight of iodine”. In other words, “total chlorine”×(126.9/35.45) “total chlorine”×3.58=“total iodine”. In a similar manner, “free chlorine” can be converted to “free iodine”.

In those cases where iodide ions are added to hypochlorous acid, if a sufficient amount of iodide ions is added to the hypochlorous acid, then all of the oxidizing power will be due to iodine, but if a sufficient amount of iodide ions is not added to the hypochlorous acid, then part of the oxidizing power will be due to hypochlorous acid, and part of the oxidizing power will be due to iodine. However, in the above DPD method, because the hypochlorous acid and iodine are both detected as free chlorine, confirming whether or not sufficient iodide ions have been added to the hypochlorous acid is problematic. In those cases where the amount added of the iodide ions is insufficient, free chlorine derived from the hypochlorous acid is retained and may cause degradation of the reverse osmosis membrane, and therefore it is necessary to selectively measure the amount of free chlorine derived from hypochlorous acid within a mixed solution containing hypochlorous acid and iodine.

As a result of intensive investigation, the inventors of the present invention found that the principles of the indophenol blue method used for measuring ammoniacal nitrogen could be applied. Iodine is known to have low reactivity relative to the amine compounds, and therefore causes almost no impediment to the reaction of this method, enabling the method to be used favorably.

[Measurement of Hypochlorous Acid Solutions Containing Potassium Iodide Using the Indophenol Blue Method]

The method disclosed in section 42.2 Indophenol Blue Absorptiometry of JIS K 0102:2013 is designed for the purpose of measuring ammonium ions, and involves creation of a calibration curve by holding the hypochlorous acid concentration constant while the amount of ammonium ions is varied. In the case of the measurement in this description, because measurement of the concentration of hypochlorous acid is the purpose, an investigation was first conducted as to whether it was possible to create a calibration curve by holding the ammonium ion concentration constant while varying the concentration of the hypochlorous acid.

Figure 3:
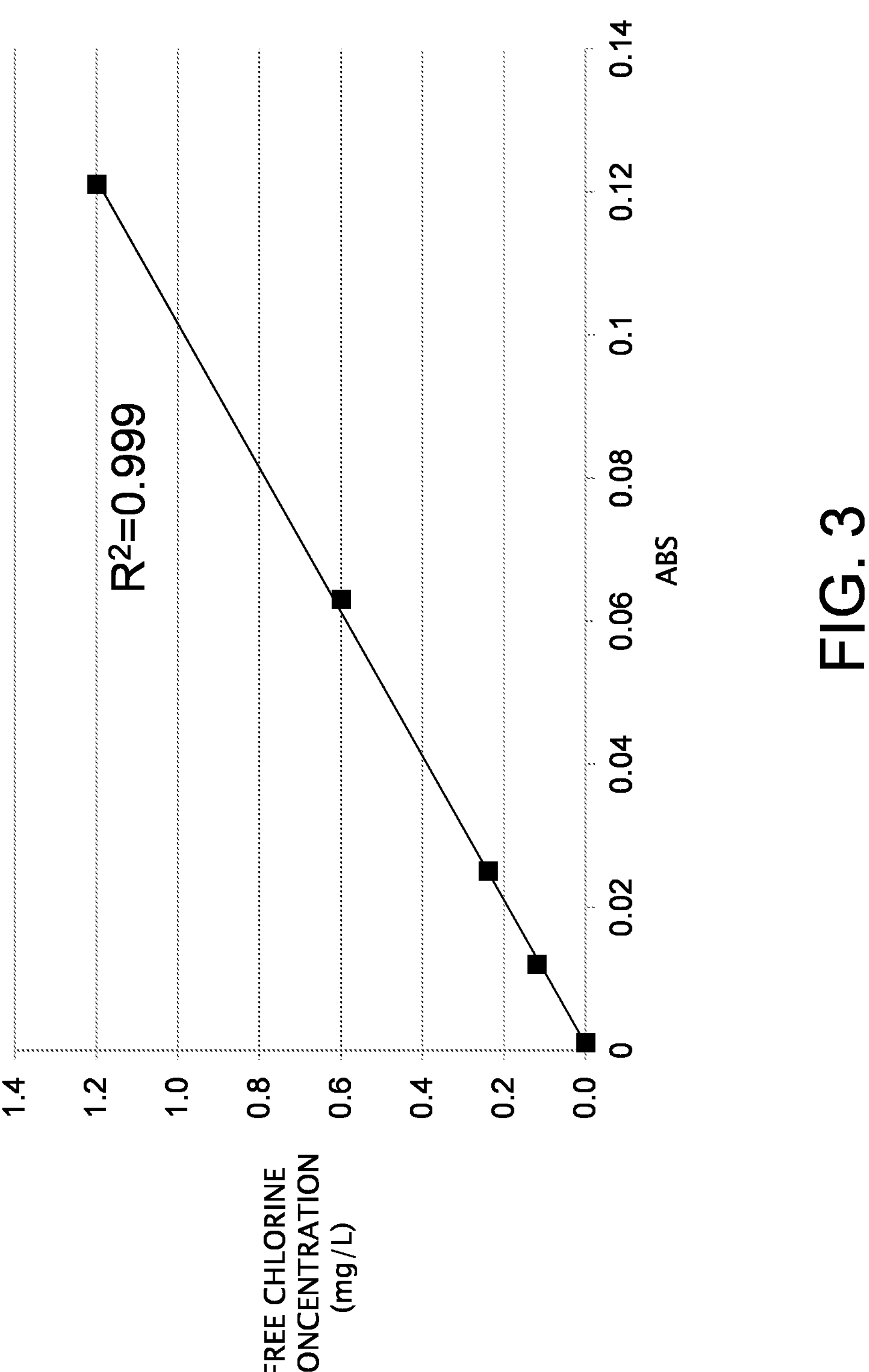
FIG. 3 is a graph illustrating a calibration curve created by varying the hypochlorous acid concentration and keeping the ammonium ion concentration constant.

Accordingly, a calibration curve was produced by adding ammonium ions to water in sufficient amount to produce a concentration of 10 mg/L, and then varying the amount of hypochlorous acid. When a calibration curve was created in accordance with the procedure described below, the $R^2$ value was 0.999. The measurement results are shown in FIG. 3. Further, using a similar method, the hypochlorous acid was replaced with iodine and measurements were attempted, but no coloration occurred, confirming that with this method, only free chlorine derived from hypochlorous acid causes coloration.

1. Samples of sodium hypochlorite are placed in 50 mL measuring cylinders in sufficient amount to produce free chlorine levels of 0 mg/L to 1.2 mg/L, and water is added to each cylinder to make the volume up to 25 mL.
2. An ammonium chloride solution is added in sufficient amount to provide 10 mg/L of ammonium ions, water is then added to bring the volume to 40 mL, and the solution is mixed.
3. Ten mL of a sodium phenoxide solution prescribed in HS K 0102 is added and mixed.
4. The solution is left to stand for about 30 minutes with the liquid temperature kept at 20 to 25° C.
5. A portion of the solution is used to measure the absorbance in the vicinity of 630 nm.

Next, a mixed solution was prepared by adding hypochlorous acid in an amount sufficient to produce a free chlorine concentration of 5 mg/L, potassium iodide was added in an amount sufficient to provide 0.1 mol to 10 mol of iodide ions relative to the free chlorine concentration, and an analysis of the hypochlorous acid in the mixed solution was conducted. When measurements of the free chlorine concentration of the solution were conducted before and after the addition of the potassium iodide using an absorption spectrophotometer DR3900 manufactured by Hach Company, there was almost no change in the free chlorine concentration. Measurements of the free chlorine concentration derived from hypochlorous acid in the mixed solution were conducted in accordance with the procedure described below. The results are shown in Table 1.

1. Samples of sodium hypochlorite are placed in 50 mL measuring cylinders in sufficient amount to produce a free chlorine level of 5 mg/L.
2. A potassium iodide solution is added in an amount sufficient to provide 0.1 mol to mol relative to the free chlorine, and water is then added to bring the volume to 25 mL.
3. An ammonium chloride solution is added in sufficient amount to provide 10 mg/L of ammonium ions, water is then added to bring the volume to 40 mL, and the solution is mixed.
4. Ten mL of a sodium phenoxide solution prescribed in HS K 0102 is added and mixed.
5. The solution is left to stand for about 30 minutes with the liquid temperature kept at 20 to 25° C.
6. A portion of the solution is used to measure the absorbance in the vicinity of 630 nm, thereby determining the free chlorine concentration derived from hypochlorous acid in the mixed solution.
7. The free chlorine concentration derived from iodine is determined by subtracting the free chlorine concentration derived from hypochlorous acid from the free chlorine concentration of the mixed solution.

TABLE 1

| $[I^-]$/ [free chlorine] | Free chlorine concentration derived from hypochlorous acid [mg/L] | Free chlorine concentration derived from iodine [mg/L] | Converted free iodine concentration [mg/L] |
|---|---|---|---|
| 0.1 | 3.9 | 1.1 | 3.9 |
| 0.5 | 0.6 | 4.4 | 15.6 |
| 1 | 0 | 5.0 | 17.9 |
| 2 | 0 | 5.0 | 17.9 |
| 3 | 0 | 5.0 | 17.9 |
| 5 | 0 | 5.0 | 17.9 |
| 10 | 0 | 5.0 | 17.9 |

In the case of the mixed solution in which the amount of KI relative to free chlorine was 0.1 mol, the free chlorine concentration derived from hypochlorous acid was 3.9 mg/L, and the free chlorine concentration derived from iodine was 1.1 mg/L, which when converted to free iodine yielded a value of 3.9 mg/L. In the case of the mixed solution in which the amount of KI relative to free chlorine was 0.5 mol, the free chlorine concentration derived from hypochlorous acid was 0.6 mg/L, and the free chlorine concentration derived from iodine was 4.4 mg/L, which when converted to free iodine yielded a value of 15.6 mg/L. In the case of the mixed solutions in which the amount of KI relative to free chlorine was within a range from 1 to 10 mol, all of the hypochlorous acid was reduced, a free chlorine concentration derived from hypochlorous acid could not be quantified (determination limit: 0.02 mg/L), and the free chlorine concentration derived from iodine was 5.0 mg/L, which when converted to free iodine yielded a value of 17.9 mg/L.

Patent Document 1 discloses that in those cases where iodine is used as an additive, a concentration of about 5 to 15 ppm is ideal, and in the examples, a potassium iodide aqueous solution is added to the solution containing hypochlorous acid in an amount sufficient to generate 15 ppm of iodine. However, as is evident from Table 1 above, the potassium iodide addition amount required to generate 15 ppm (15 mg/L) of iodine is equivalent to [$I^-$]/[free chlorine] =0.5, and therefore the potassium iodide addition amount is insufficient, with 0.6 mg/L of free chlorine derived from hypochlorous acid still retained, meaning there is a possibility of degradation of the reverse osmosis membrane.

In the iodide ion addition step, the free iodine CT value, represented by the free iodine concentration (mg/L) produced in the water to be treated by adding at least 1 mol of iodide ions per 1 mol of the free chlorine content and free bromine content in the water to be treated containing the hypochlorous acid or the like×the iodide ion addition time (h), is preferably not more than 1.25 (mg/L·h), and is more preferably 1.0 (mg/L·h) or less. In the oxidizing agent addition step, the free iodine CT value, represented by the free iodine concentration (mg/L) produced in the water to be treated obtained by adding at least one of the chlorine-based oxidizing agent and the bromine-based oxidizing agent in such an amount that the free chlorine content and free bromine content does not reach more than 1 mol per 1 mol of the iodide ions in the water to be treated containing the iodide ions×the addition time (h) for at least one of the chlorine-based oxidizing agent and the bromine-based oxidizing agent, is preferably not more than 1.25 (mg/L·h), and is more preferably 1.0 (mg/L·h) or less. If this free iodine CT value exceeds 1.25, then it can sometimes result in a deterioration in the water quality of the reverse osmosis membrane permeate.

In the iodide ion addition step or the oxidizing agent addition step, the method used for adding the iodide ions or the chlorine-based oxidizing agent or the like to the water to be treated may be either a continuous addition in which the iodide ions or the chlorine-based oxidizing agent or the like is added continuously to the water to be treated, or an intermittent addition that provides an addition period during which the iodide ions or the chlorine-based oxidizing agent or the like is added to the water to be treated, and a non-addition period during which the iodide ions or the chlorine-based oxidizing agent or the like is not added to the water to be treated. In terms of chemical costs and the like, intermittent addition is preferred.

In the iodide ion addition step or the oxidizing agent addition step, intermittent addition in which the addition period is a continuous period of at least 10 seconds but not more than 3 hours, and the non-addition period is a continuous period of at least 5 seconds but less than 48 hours is preferred.

Furthermore, it is preferable that a reducing agent is added during this non-addition period. As illustrated in FIG. 2, the reducing agent is passed through the reducing agent addition line 30 and added to the water to be treated in the membrane filtration treatment step, or the water to be treated in the reverse osmosis membrane treatment step (the membrane filtration treated water) (a reducing agent addition step). The location at which the reducing agent is added to the water to be treated during the non-addition period may be any one of the water to be treated line 18, the water to be treated line 20 upstream from the membrane filtration device 12, and the membrane filtration treated water line 22 downstream from the membrane filtration device 12. The addition location for the reducing agent is preferably upstream from the addition location for the iodide ions or chlorine-based oxidizing agent or the like.

In those cases where a reducing agent is not added during the non-addition period, degradation of the reverse osmosis membrane may sometimes arise. Examples of the reducing agent include sulfite salts such as sodium sulfite, bisulfite salts such as sodium bisulfite, thiosulfate salts such as sodium thiosulfate, as well as hydrazine, hydroxylamine and hydrogen sulfide. Among these, from the viewpoints of safety and the like, sulfite salts, bisulfite salts and thiosulfate salts are preferred, and thiosulfate salts are particularly preferred.

As shown below in formulas (1) and (2), in the case of a sulfite salt or bisulfite salt, free iodine reacts with the reducing agent in an equimolar ratio, whereas in the case of a thiosulfate salt, as shown in formula (3), the iodine reacts with the reducing agent in a ½ molar ratio. If some reducing agent added during the non-addition period is retained, then the reducing agent reduces the free iodine produced during the addition period, but by using a thiosulfate salt, the amount of this reduction can be suppressed compared with the case of a sulfite salt or bisulfite salt.

$$I_2 + SO_3^{2-} + H_2O \rightarrow H_2SO_4 + 2I^- \quad \text{formula (1)}$$

$$I_2 + HSO_3^- + H_2O \rightarrow 2I^- + 3H^+ + SO_4^{2-} \quad \text{formula (2)}$$

$$I_2 + 2S_2O_3^{2-} \rightarrow 2I^- + S_4O_6^{2-} \quad \text{formula (3)}$$

In those cases where iodide ions are added to a water to be treated containing at least one of the chlorine-based oxidizing agent and the bromine-based oxidizing agent, the time from addition of the iodide ions until the water reaches the reverse osmosis membrane is preferably set to at least 15 seconds, and more preferably 20 seconds or longer. If the time from addition of the iodide ions until the water reaches the reverse osmosis membrane is less than 15 seconds, then there is a possibility that the chlorine-based oxidizing agent or the like may not be sufficiently reduced by the iodide ions, meaning degradation of the reverse osmosis membrane may occur.

The region from the location of the addition of the iodide ions through to the reverse osmosis membrane device 14 that conducts the reverse osmosis membrane treatment step is preferably operated as a closed system. If exposure to the atmosphere or aeration occurs, then the amount of free iodine may sometimes decrease. For this reason, the addition of the iodide ions is preferably performed as a line addition through an enclosed line.

The amount added of the iodide ions is preferably controlled so that the oxidation-reduction potential (ORP) of the water to be treated in the reverse osmosis membrane treatment following the addition of at least 1 mol of iodide ions per 1 mol of the free chlorine content and free bromine content in the water to be treated that contains the chlorine-based oxidizing agent or the like is not more than 550 mV. This oxidation-reduction potential is preferably not more than 540 mV, and more preferably 520 mV or less. If this oxidation-reduction potential exceeds 550 mV, then degradation of the reverse osmosis membrane may occur. The amount added of the iodide ions to the water to be treated can be easily controlled via the oxidation-reduction potential. For example, in those cases where iodide ions are added as a water treatment agent composition containing water and an iodide salt, even if the free chlorine content of the water to be treated is not stable, the amount of iodide ions added to the water to be treated can still be controlled via the oxidation-reduction potential.

The iodide ions added to the water to be treated may be in any form that enables at least 1.0 mol of iodide ions to be added per 1 mol of the free chlorine content and free bromine content. The iodide ions may be added in the form of an iodide salt such as solid sodium iodide or potassium iodide, may be added in the form of an aqueous solution prepared in advance by dissolving an iodide salt such as sodium iodide or potassium iodide in water, or may be added in the form of an aqueous solution already containing free iodine, which can be prepared by dissolving iodine in an aqueous solution containing a dissolved iodide salt such as sodium iodide or potassium iodide. From the viewpoints of handling and the like, the iodide ions are preferably added as an aqueous solution, and from the viewpoints of the storage properties and the like, addition in the form of an aqueous solution that does not contain free iodine is more preferred.

<Water Treatment Agent Composition>

A water treatment agent composition that can be used in the water treatment method according to an embodiment of the present invention is a composition containing water and an iodide salt. If the amount of the chlorine-based oxidizing agent or the like contained in the water to be treated is low (for example, 0.1 mg/L or less), then the amount of iodine produced as a result of oxidation by the iodide salt decreases. In such cases, the water treatment agent composition may also contain iodine.

It is preferable that the water treatment agent composition used in the water treatment method according to an embodiment of the present invention contains water and an iodide salt, that the amount of the iodide salt in the water treatment agent composition expressed as an amount of iodide ions, is at least 20% by mass, and that the pH of the water treatment agent composition is at least as large as the value calculated using formula (1) shown below.

$$\text{pH} = 5.24 \times \log(\text{amount of iodide ions (\% by mass)}) - 8.27 \quad (1)$$

The inventors of the present invention discovered that in a water treatment agent composition composed of an iodide aqueous solution containing water and an iodide salt, by ensuring that the pH is at least as large as the value calculated using the above formula (1), the release of free iodine was suppressed even when the amount of the iodide salt represented a high iodide ion concentration of 20% by mass or higher.

If the pH of the water treatment agent composition is less than the value calculated using the above formula (1), there is a possibility that free iodine may be released during storage, resulting in permeation into the storage container and a reduction in the intended reducing power. The pH of the water treatment agent composition is preferably at least as large as the value calculated using the above formula (1)+0.35.

The iodide salt contained in the water treatment agent composition is an inorganic salt of iodine, and examples include sodium iodide, potassium iodide, lithium iodide, copper iodide and zinc iodide, although from the viewpoints of cost and the like, sodium iodide or potassium iodide is preferred. The water treatment agent composition may contain a single iodide salt, or may contain two or more iodide salts.

There are no particular limitations on the water, and examples include tap water or purified water.

The amount of the iodide salt in the water treatment agent composition is preferably at least 20% by mass, more preferably at least 30% by mass, and even more preferably 40% by mass or greater. If the amount of the iodide salt is less than 20% by mass, then there is a possibility of an increase in costs associated with using the composition, including transport, storage and addition of the composition, as a result of an increase in the usage amount required. The upper limit for the amount of the iodide salt is, for example, not more than 56% by mass.

In those cases where the water treatment agent composition also contains iodine, the iodine content is preferably at least 3% by mass, more preferably at least 5% by mass, and even more preferably 10% by mass or greater. If the iodine content is less than 3% by mass, then the sterilizing power may sometimes be inadequate. The upper limit for the iodine content is, for example, not more than 30% by mass.

The water treatment agent composition may also contain an alkali. The alkali may be any substance that raises the pH of the solution, ad examples include hydroxides such as sodium hydroxide, potassium hydroxide, calcium hydroxide, ammonium hydroxide and tetramethylammonium hydroxide, carbonate salts such as sodium carbonate and potassium carbonate, and bicarbonate salts such as sodium bicarbonate and potassium bicarbonate. Among these, from the viewpoints of safety and production cost and the like, hydroxides such as sodium hydroxide, potassium hydroxide and calcium hydroxide are preferred, and sodium hydroxide or potassium hydroxide is particularly preferred.

Furthermore, from the viewpoints of the storage stability and the like, the amount of the alkali agent in the composition is preferably at least 0.01% by mass, and more preferably 0.1% by mass or greater. The upper limit for the amount of the alkali agent is, for example, 10% by mass or less.

The amount of the iodide salt in the water treatment agent composition, expressed as an amount of iodide ions, is preferably at least 20% by mass, more preferably at least 30% by mass, and even more preferably 40% by mass or greater. If the amount of the iodide salt, expressed as an amount of iodide ions, is less than 20% by mass, then there is a possibility of an increase in costs associated with using the composition as a result of an increase in the usage amount required. The upper limit for the amount of the iodide salt is, for example, an iodide ion amount of not more than 42% by mass.

The total iodine in the water treatment agent composition can be determined using the DPD (N,N-diethyl-p-phenylenediamine) method described above.

The water treatment agent composition according to an embodiment of the present invention preferably contains no organic matter. The expression "contains no organic matter" means that the TOC of the water treatment agent composition is not more than 100 mg/L, and preferably 10 mg/L or less.

The water treatment agent composition according to an embodiment of the present invention can be used favorably as a water treatment agent for reducing residual chlorine in the water to be treated and sterilizing the water to be treated. The iodide ions contained in the water treatment agent composition can effectively reduce and detoxify any residual chlorine. The water treatment agent composition according to this embodiment can be used particularly favorably as a sterilization assistant in a reverse osmosis membrane treatment.

In water treatment devices, an oxidizing agent such as hypochlorous acid or hypobromous acid is generally added for the purposes of sterilization and suppressing slime formation. However, it is known that when these oxidizing agents are not fully consumed for these purposes of sterilization and suppressing slime formation and are retained in the water to be treated, then inflow into the downstream water treatment device can have adverse effects on those downstream water treatment devices. This inflow of residual chlorine or the like can, for example, cause corrosion in cooling towers, cause degradation in the performance of the reverse osmosis membrane in reverse osmosis membrane devices, and cause marked oxidative degradation in resin towers or electrodeionization (EDI) systems.

The water treatment agent composition according to an embodiment of the present invention can suppress these types of adverse effects on downstream water treatment devices, and can suppress corrosion in cooling towers, degradation in the performance of the reverse osmosis membrane in reverse osmosis membrane devices, and oxidative degradation in resin towers or electrodeionization (EDI) systems.

In those cases where the water treatment agent composition described above is used in a water treatment, the water treatment agent composition may be added, for example, to the water to be treated containing at least one of a chlorine-based oxidizing agent and a bromine-based oxidizing agent. Further, in a water treatment method in which a water to be treated containing at least one of a chlorine-based oxidizing agent and a bromine-based oxidizing agent is treated using a reverse osmosis membrane, the water treatment agent composition described above may be added to the water to be treated.

By adding an iodide salt to a water to be treated by a reverse osmosis membrane treatment or the like containing at least one of a chlorine-based oxidizing agent and a bromine-based oxidizing agent, any chlorine-based oxidizing agent or the like that may possibly cause degradation of the reverse osmosis membrane or the like can be reduced. The iodide ions are oxidized by the chlorine-based oxidizing agent or the like to form iodine which has sterilizing power, thereby converting the iodide ions into a slime inhibitor that inhibits slime formation while causing almost no degradation of the reverse osmosis membrane or the like. As a result, by adding the iodide ions to the water to be treated containing the chlorine-based oxidizing agent or the like, degradation of the reverse osmosis membrane can be suppressed, and slime formation can also be suppressed.

EXAMPLES

The present invention is described below in further detail using a series of examples and comparative examples, but the present invention is not limited to the following examples.

Example 1, Comparative Example 1

Under the test conditions described below, hypochlorous acid was added to a water supply (water to be treated) for a reverse osmosis membrane device in sufficient amount to produce a free chlorine concentration of 5 mg/L. Potassium iodide was added at a location downstream from a high-pressure RO pump in sufficient amount to generate an amount of iodide ions of 0.5 mol, 1.0 mol or 2.0 mol relative to the free chlorine. The free chlorine was measured using an absorption spectrophotometer DR3900 manufactured by Hach Company. The results are shown in Table 2.

(Test Conditions)

Test apparatus: reverse osmosis membrane element test device

Supply pressure: 0.2 to 0.35 MPa

Water supply: Sagamihara well water (dechlorinated, bacterial count: $2\times10^3$ CFU/mL)

Water temperature: 16 to 19° C.

pH: 7.3 to 7.7

Hypochlorous acid concentration: added to the water to be treated in sufficient amount to achieve free chlorine of 5 mg/L Potassium chloride: 99.8% potassium chloride manufactured by Godo Shigen Co., Ltd.

Reverse osmosis membrane: 4-inch reverse osmosis membrane element (ESPA2) manufactured by Nitto Denko Corporation Flow rates: concentrate 500 L/h, permeate 125 L/h

TABLE 2

| | $[I^-]$/ [free chlorine] | Operating time [h] | EC rejection rate [%] | | Ionic silica rejection rate [%] | |
|---|---|---|---|---|---|---|
| | | | Before water flow | After water flow | Before water flow | After water flow |
| Comparative Example 1 | 0.5 | 1000 | 98 | 90 | 98 | 85 |
| Example 1-1 | 1.0 | 1000 | 98 | 98 | 98 | 98 |
| Example 1-2 | 2.0 | 1000 | 98 | 98 | 98 | 98 |

In Comparative Example 1, when operations were conducted with the addition of sufficient potassium iodide aqueous solution to provide 0.5 mol of iodide ions relative to the free chlorine content, the EC rejection rate (rejection rate determined by electrical conductivity) after 1,000 hours of operating time had fallen from 98% to 90%, and the ionic silica rejection rate had fallen from 98% to 85%, confirming that oxidizing power derived from residual hypochlorous acid that had not been reduced by the iodide ions had cause oxidative degradation of the reverse osmosis membrane. In Examples 1-1 and 1-2, when operations were conducted with the addition of sufficient potassium iodide aqueous solution to provide 1.0 mol or 2.0 mol respectively of iodide ions relative to the free chlorine, almost no changes were observed in the EC rejection rate and the ionic silica rejection rate after 1,000 hours of operating time, confirming that almost no degradation of the reverse osmosis membrane had occurred. Further, under each of these conditions, almost no increase was observed in the water flow differential pressure, indicating that a satisfactory slime inhibitory effect had been achieved.

Example 2, Reference Example 1

Using the water treatment device illustrated in FIG. 1, treatments were conducted under the test conditions described below, with the free iodine CT value (mg/L h), represented by (free iodine in water to be treated (mg/L))×(iodide ion addition time (h)) varied as shown in Table 3. The results are shown in Table 3.

(Test Conditions)

Test water: Sagamihara well water (dechlorinated, bacterial count: $2\times10^3$ CFU/mL)

Chemical reagent: water treatment agent composition containing free iodine (potassium iodide content: 20% by mass)

pH: 7.0

Reverse osmosis membranes: ES20, ESPA2, LFC3 manufactured by Nitto Denko Corporation, and TML10D manufactured by Toray Industries, Inc.

TABLE 3

| | CT value [mg/L · h] | Free iodine concentration C in water to be treated [mg/L] | Addition time T [h] | Free iodine concentration in permeate [mg/L] |
|---|---|---|---|---|
| Reference | 2.5 | 5 | 0.5 | 1.1 |
| Example 1 | 7.5 | 15 | 0.5 | 4.5 |
| Example 2 | 0.43 | 5.4 | 0.08 | 0.03 |
| | 0.46 | 2.7 | 0.17 | |
| | 0.45 | 0.9 | 0.5 | |
| | 0.5 | 0.25 | 2 | |
| | 0.67 | 2.7 | 0.25 | 0.1 |
| | 0.7 | 5.4 | 0.13 | |
| | 0.75 | 0.9 | 0.83 | |
| | 0.75 | 0.25 | 3 | |
| | 0.9 | 5.3 | 0.17 | 0.14 |
| | 0.89 | 2.7 | 0.33 | |
| | 0.9 | 0.9 | 1 | |
| | 1 | 0.25 | 4 | |
| | 1.1 | 0.9 | 1.2 | 0.18 |
| | 1.1 | 2.7 | 0.42 | |
| | 1.2 | 5.4 | 0.22 | |
| | 1.25 | 0.25 | 5 | |

It was evident that by ensuring that the CT value was not more than 1.25, the free iodine concentration in the permeate was able to be suppressed, and any deterioration in the permeate water quality could be suppressed. In Reference Example 1, the water treatment agent composition was added under addition conditions corresponding with the free iodine CT value in Patent Document 1.

Example 3, Reference Example 2

A potassium iodide aqueous solution (potassium iodide content: 20% by mass) was added to purified water containing hypochlorous acid in an amount sufficient to provide a total chlorine concentration of 0.5 mg/L, the solution was stored in an I-BOY wide-mouth bottle (manufactured by AS ONE Corporation) under constant stirring using a stirrer using the storage conditions described below, and after storage for a prescribed period, the total chlorine retention rate (%) was calculated. The results are shown in Table 4.

Example 3: lid closed to create a closed system

Reference Example 2-1: lid removed and top left open

Reference Example 2-2: lid removed and aeration conducted

TABLE 4

| Storage time [min] | Total chlorine retention rate [%] Example 3 | Reference Example 2-1 | Reference Example 2-2 |
|---|---|---|---|
| 0 | 100 | 100 | 100 |
| 10 | 100 | 96 | 88 |
| 30 | 100 | 88 | 74 |
| 60 | 100 | 79 | 53 |
| 120 | 100 | 63 | 23 |
| 180 | 100 | 56 | 12 |
| 240 | 100 | 44 | 5 |
| 300 | 100 | 33 | 5 |
| 1140 | 100 | 0 | 0 |

In Example 3, even after 1140 minutes had elapsed, the total chlorine was 100% retained, but in Reference Example 2-1 the total chlorine retention rate had decreased after 10 minutes had elapsed, and had decreased to 0 after 1140 minutes. In Reference Example 2-2, in a similar manner to that observed in Reference Example 2-1, the total chlorine retention rate had decreased after 10 minutes had elapsed, and the total chlorine retention rate was lower than that observed in Reference Example 2-1. In this manner, it was evident that in a closed system there was almost no reduction in total chlorine and a satisfactory sterilization effect could be maintained.

Example 4, Comparative Example 2, Reference Example 3

Under the test conditions described below, sodium hypochlorite was added to the test water in sufficient amount to produce a free chlorine concentration of 1 mg/L, and then potassium iodide was added in an amount of 0.1 to 10 mol relative to the free chlorine content. The oxidation-reduction potential (ORP) was measured using a portable ORP meter (model RM-30P, manufactured by DKK-TOA Corporation). The results are shown in Table 5. Almost no change in the free chlorine concentration was observed from before the potassium iodide addition to after the addition.

(Test Conditions)

Test water: Sagamihara well water (dechlorinated)

pH: 7.0 (adjusted following the sodium hypochlorite addition)

TABLE 5

| | $[I^-]$/[free chlorine] | ORP |
|---|---|---|
| Reference Example 3 | 0 | 754 |
| Comparative Example 2-1 | 0.1 | 708 |
| Comparative Example 2-2 | 0.5 | 686 |
| Example 4-1 | 1.0 | 546 |
| Example 4-2 | 2.0 | 516 |
| Example 4-3 | 3.0 | 507 |

In Reference Example 3, in which no potassium iodide was added, the ORP of the test water containing sodium hypochlorite in an amount equivalent to 1 mg/L of free chlorine was 754 mV. In Comparative Examples 2-1 and 2-2, in which potassium iodide was added in an amount sufficient to provide 0.1 mol and 0.5 mol respectively of iodide ions relative to the free chlorine, the ORP values were high values of 708 mV and 686 mV respectively, and it was clear that there was a possibility of degradation of the reverse osmosis membrane. In Examples 4-1, 4-2 and 4-3, in which potassium iodide was added in an amount sufficient to provide 1.0 mol, 2.0 mol and 3.0 mol respectively of iodide ions relative to the free chlorine, the ORP values were much lower values of 546 mV, 516 mV and 507 mV respectively, indicating a lower likelihood of degradation of the reverse osmosis membrane. Accordingly, it is preferable that the amount of iodide ions added is controlled so that the oxidation-reduction potential (ORP) of the water to be treated is not more than 550 mV.

As described above, in the examples, in the reverse osmosis membrane treatment of a water to be treated containing at least one of a chlorine-based oxidizing agent and a bromine-based oxidizing agent, it was possible to suppress degradation of the reverse osmosis membrane and to suppress slime formation.

Examples 5 to 8, Comparative Examples 3 to 6, Reference Example 4

Using the formations shown in Table 6 to Table 10, potassium iodide, a pH modifier (an acid or an alkali) and water were mixed together, and storage stability tests were conducted. For each of the formulations and pH values, the mixture was stored in a dark closed system at room temperature (25±2° C.) for a period of 7 days, 14 days or 30 days, and the active component was then measured. The amount of free iodine was measured using an absorption spectrophotometer DR3900 manufactured by Hach Company.

TABLE 6

| | | Comparative Example 3-1 | Comparative Example 3-2 | Comparative Example 3-3 | Comparative Example 3-4 | Comparative Example 3-5 | Comparative Example 3-6 | Example 5-1 | Example 5-2 |
|---|---|---|---|---|---|---|---|---|---|
| Formulation [% by mass] | Potassium iodide | 55 | 55 | 55 | 55 | 55 | 55 | 55 | 55 |
| | 0.35% HCl | 0.06 | 0.055 | 0.03 | 0.015 | 0.005 | — | — | — |
| | 0.48% KOH | — | — | — | — | — | 0.015 | 0.08 | 0.7 |
| | Water | 44.9 | 44.9 | 45.0 | 45.0 | 45.0 | 45.0 | 44.9 | 44.3 |
| | Total | 100 | 100 | 100 | 100 | 100 | 100 | 100 | 100 |
| Physical properties | pH | 4.93 | 6.07 | 6.92 | 7.97 | 8.99 | 10.04 | 10.97 | 12.00 |
| | Iodide ions [% by mass] | 42.0 | 42.0 | 42.0 | 42.0 | 42.0 | 42.0 | 42.0 | 42.0 |
| Storage stability (amount of produced iodine) [mg/100 g] | Storage at 25° C. 7 days | 0.65 | 0.23 | 0.10 | 0.15 | <0.10 | <0.10 | <0.10 | <0.10 |
| | 15 days | 0.73 | 0.33 | 0.23 | 0.25 | 0.25 | 0.28 | <0.10 | <0.10 |
| | 30 days | 0.80 | 0.38 | 0.33 | 0.38 | 0.38 | 0.30 | <0.10 | <0.10 |

TABLE 7

| | | Comparative Example 4-1 | Comparative Example 4-2 | Comparative Example 4-3 | Comparative Example 4-4 | Comparative Example 4-5 | Comparative Example 4-6 | Example 6-1 | Example 6-2 |
|---|---|---|---|---|---|---|---|---|---|
| Formulation [% by mass] | Potassium iodide | 50 | 50 | 50 | 50 | 50 | 50 | 50 | 50 |
| | 0.35% HCl | 0.06 | 0.04 | 0.03 | 0.015 | 0.005 | — | — | — |
| | 0.48% KOH | — | — | — | — | — | 0.015 | 0.08 | 0.8 |
| | Water | 49.9 | 50.0 | 50.0 | 50.0 | 50.0 | 50.0 | 49.9 | 49.2 |
| | Total | 100 | 100 | 100 | 100 | 100 | 100 | 100 | 100 |
| Physical properties | pH | 4.93 | 6.00 | 6.93 | 8.02 | 8.93 | 9.99 | 11.00 | 12.01 |
| | Iodide ions [% by mass] | 38.2 | 38.2 | 38.2 | 38.2 | 38.2 | 38.2 | 38.2 | 38.2 |
| Storage stability (amount of produced iodine) [mg/100 g] | Storage at 25° C. 7 days | 0.50 | 0.23 | 0.20 | 0.20 | 0.15 | 0.15 | <0.10 | <0.10 |
| | 15 days | 0.55 | 0.30 | 0.28 | 0.25 | 0.25 | 0.18 | <0.10 | <0.10 |
| | 30 days | 0.68 | 0.35 | 0.33 | 0.33 | 0.30 | 0.28 | <0.10 | <0.10 |

TABLE 8

| | | Comparative Example 5-1 | Comparative Example 5-2 | Comparative Example 5-3 | Comparative Example 5-4 | Comparative Example 5-5 | Example 7-1 | Example 7-2 | Example 7-3 |
|---|---|---|---|---|---|---|---|---|---|
| Formulation [% by mass] | Potassium iodide | 40 | 40 | 40 | 40 | 40 | 40 | 40 | 40 |
| | 0.35% HCl | 0.05 | 0.03 | 0.02 | 0.015 | 0.005 | — | — | — |
| | 0.48% KOH | — | — | — | — | — | 0.02 | 0.12 | 1.05 |
| | Water | 60.0 | 60.0 | 60.0 | 60.0 | 60.0 | 60.0 | 59.9 | 59.0 |
| | Total | 100 | 100 | 100 | 100 | 100 | 100 | 100 | 100 |
| Physical properties | pH | 4.97 | 6.02 | 6.94 | 7.99 | 9.00 | 10.00 | 10.98 | 12.00 |
| | Iodide ions [% by mass] | 30.6 | 30.6 | 30.6 | 30.6 | 30.6 | 30.6 | 30.6 | 30.6 |
| Storage stability | Storage at 7 days | 0.13 | <0.10 | <0.10 | <0.10 | <0.10 | <0.10 | <0.10 | <0.10 |

TABLE 8-continued

| | | | Comparative Example 5-1 | Comparative Example 5-2 | Comparative Example 5-3 | Comparative Example 5-4 | Comparative Example 5-5 | Example 7-1 | Example 7-2 | Example 7-3 |
|---|---|---|---|---|---|---|---|---|---|---|
| (amount of produced | 25° C. | 15 days | 0.23 | 0.13 | <0.10 | 0.18 | <0.10 | <0.10 | <0.10 | <0.10 |
| iodine) [mg/100 g] | | 30 days | 0.35 | 0.33 | 0.23 | 0.30 | 0.25 | <0.10 | <0.10 | <0.10 |

TABLE 9

| | | Comparative Example 6-1 | Comparative Example 6-2 | Comparative Example 6-3 | Example 8-1 | Example 8-2 | Example 8-3 | Example 8-4 | Example 8-5 |
|---|---|---|---|---|---|---|---|---|---|
| Formulation | Potassium iodide | 30 | 30 | 30 | 30 | 30 | 30 | 30 | 30 |
| [% by mass] | 0.35% HCl | 0.043 | 0.025 | 0.01 | 0.005 | — | — | — | — |
| | 0.48% KOH | — | — | — | — | — | 0.03 | 0.19 | 1.74 |
| | Water | 70.0 | 70.0 | 70.0 | 70.0 | 70.0 | 70.0 | 69.8 | 68.3 |
| | Total | 100 | 100 | 100 | 100 | 100 | 100 | 100 | 100 |
| Physical | pH | 4.96 | 6.01 | 6.97 | 7.95 | 9.01 | 10.01 | 11.01 | 12.00 |
| properties | Iodide ions [% by mass] | 22.9 | 22.9 | 22.9 | 22.9 | 22.9 | 22.9 | 22.9 | 22.9 |
| Storage stability | Storage at 7 days | <0.10 | <0.10 | <0.10 | <0.10 | <0.10 | <0.10 | <0.10 | <0.10 |
| (amount of produced | 25° C. 15 days | 0.15 | 0.15 | 0.13 | <0.10 | <0.10 | <0.10 | <0.10 | <0.10 |
| iodine) [mg/100 g] | 30 days | 0.18 | 0.15 | 0.13 | <0.10 | <0.10 | <0.10 | <0.10 | <0.10 |

TABLE 10

| | | Reference Example 4-1 | Reference Example 4-2 | Reference Example 4-3 | Reference Example 4-4 | Reference Example 4-5 | Reference Example 4-6 | Reference Example 4-7 | Reference Example 4-8 |
|---|---|---|---|---|---|---|---|---|---|
| Formulation | Potassium iodide | 20 | 20 | 20 | 20 | 20 | 20 | 20 | 20 |
| [% by mass] | 0.35% HCl | 0.025 | 0.015 | 0.005 | 0.002 | — | — | — | — |
| | 0.48% KOH | — | — | — | — | 0.005 | 0.035 | 0.23 | 2.25 |
| | Water | 80.0 | 80.0 | 80.0 | 80.0 | 80.0 | 80.0 | 79.8 | 77.8 |
| | Total | 100 | 100 | 100 | 100 | 100 | 100 | 100 | 100 |
| Physical | pH | 4.99 | 6.02 | 6.95 | 7.97 | 9.04 | 10.02 | 10.99 | 12.00 |
| properties | Iodide ions [% by mass] | 15.3 | 15.3 | 15.3 | 15.3 | 15.3 | 15.3 | 15.3 | 15.3 |
| Storage stability | Storage at 7 days | <0.10 | <0.10 | <0.10 | <0.10 | <0.10 | <0.10 | <0.10 | <0.10 |
| (amount of produced | 25° C. 15 days | <0.10 | <0.10 | <0.10 | <0.10 | <0.10 | <0.10 | <0.10 | <0.10 |
| iodine) [mg/100 g] | 30 days | 0.13 | <0.10 | <0.10 | <0.10 | <0.10 | <0.10 | <0.10 | <0.10 |

When the water, potassium iodide, and either 0.35% hydrochloric acid or 0.48% potassium hydroxide were mixed in the blend ratios shown in Table 6 (Example 5, Comparative Example 3), substantially uniform liquids were obtained. When the pH was 4.93, the solution colored yellow immediately following production, and 0.0004% by mass of free iodine was detected. Under the other conditions, the solutions were colorless and transparent immediately following production, and no free iodine was detected (detection lower limit: <0.10 mg/100 g). When the storage tests were conducted using the obtained formulations, it was evident that by ensuring conditions with a pH of 11 or higher, iodine production was able to be suppressed following storage at 25° C. for 30 days. The results are shown in Table 11. In Table 11, "○" indicates that free iodine was not detected following storage at 25° C. for 30 days, whereas "×" indicates that free iodine was detected following storage at 25° C. for 30 days.

When the water, potassium iodide, and either 0.35% hydrochloric acid or 0.48% potassium hydroxide were mixed in the blend ratios shown in Table 7 (Example 6, Comparative Example 4), substantially uniform liquids were obtained, and under all of the various conditions, the solutions were colorless and transparent immediately following production, with no free iodine being detected. When the storage tests were conducted using the obtained formulations, it was evident that by ensuring conditions with a pH of 11 or higher, iodine production was able to be suppressed following storage at 25° C. for 30 days. The results are shown in Table 11.

When the water, potassium iodide, and either 0.35% hydrochloric acid or 0.48% potassium hydroxide were mixed in the blend ratios shown in Table 8 (Example 7, Comparative Example 5), Table 9 (Example 8, Comparative Example 6) and Table 10 (Reference Example 4), substantially uniform liquids were obtained, and under all of the various conditions, the solutions were colorless and transparent immediately following production, with no free iodine being detected. When the storage tests were conducted using the obtained formulations, it was evident that by ensuring conditions with a pH of 10, 8 or 6 or higher respectively, iodine production was able to be suppressed following storage at 25° C. for 30 days. The results are shown in Table 11.

TABLE 11

| | | Amount of iodide ions [% by mass] | | | | |
|---|---|---|---|---|---|---|
| | | 15.3 | 22.9 | 30.6 | 38.2 | 42 |
| pH | 12 | ○ | ○ | ○ | ○ | ○ |
| | 11 | ○ | ○ | ○ | ○ | ○ |
| | 10 | ○ | ○ | ○ | x | x |
| | 9 | ○ | ○ | x | x | x |
| | 8 | ○ | ○ | x | x | x |
| | 7 | ○ | x | x | x | x |
| | 6 | ○ | x | x | x | x |
| | 5 | x | x | x | x | x |

Figure 4:
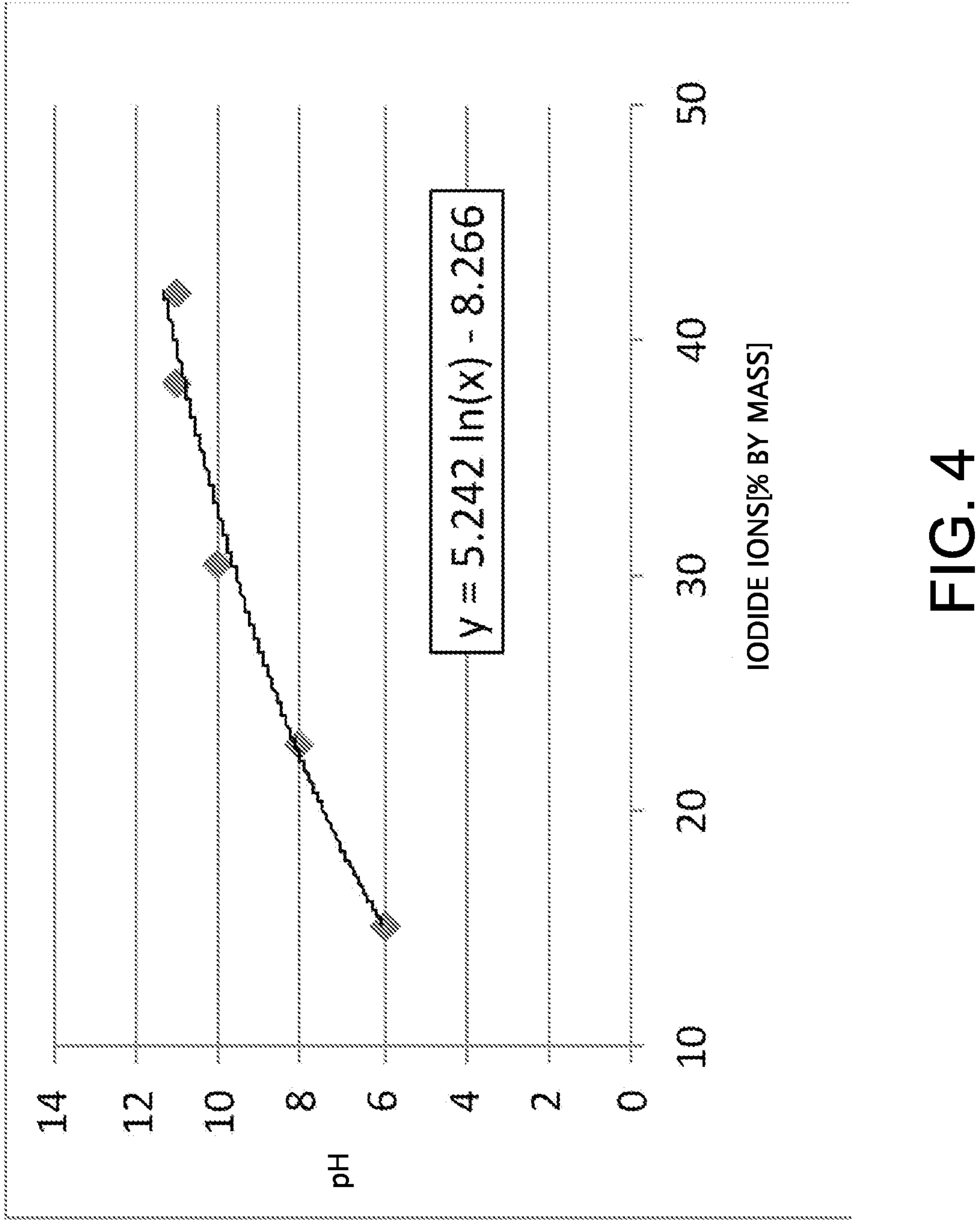
FIG. 4 is a graph illustrating the relationship between the amount of iodide ions (% by mass) in the water treatment agent compositions of Examples 5 to 8, Comparative Examples 3 to 6 and Reference Example 4, and the pH at which free iodine was not detected.

FIG. 4 is a graph illustrating the relationship between the amount of iodide ions (% by mass) in the composition, and the pH at which free iodine became undetectable (in Table 11, the lower limit for the pH at which the evaluation result became "○"). Based on these results, the formula: pH=5.24×log(amount of iodide ions (% by mass))−8.27 of the above formula (1) was derived.

Solutions in which free iodine was detected had a light yellow external appearance, with the yellow color becoming more intense as the concentration increased. Because solution containing free iodine can cause coloring of the container in this manner, storage under conditions in which almost no iodine is generated is preferred. Provided a solution satisfies the iodide salt content and pH value specified in the examples, the solution can be stored stably for long periods with almost no generation of free iodine.

In this manner, in the examples, water treatment agent compositions containing a high concentration of iodide salt but with good suppression of free iodine formation were able to be obtained.

Example 9, 10

Figure 5:
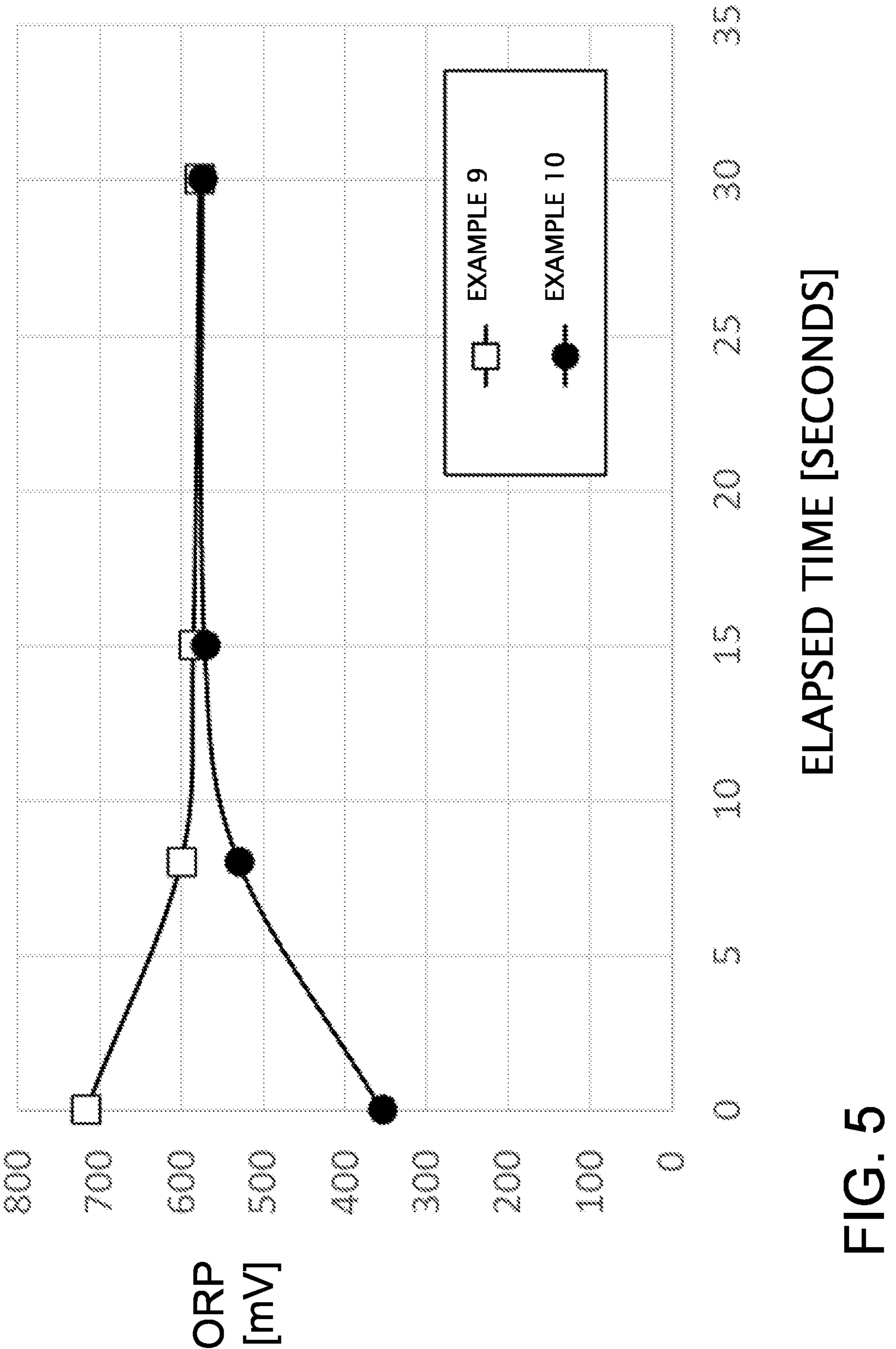
FIG. 5 is a graph illustrating the change in the oxidation-reduction potential (mV) relative to the time elapsed (seconds) in Examples 9 and 10.

Sodium hypochlorite (equivalent to a free chlorine concentration of 1 mg/L) and potassium iodide (1.5 mol relative to the free chlorine content) were mixed with purified water, and the oxidation-reduction potential (ORP) was measured over time. In Example 9, the potassium iodide was added to a sodium hypochlorite solution, whereas in Example 10, the sodium hypochlorite was added to a potassium iodide solution. The oxidation-reduction potential values were measured using a portable ORP meter (model RM-30P, manufactured by DKK-TOA Corporation). The results are shown in FIG. 5.

In Example 9, the oxidation-reduction potential prior to mixing was at least 700 mV, but this value gradually decreased after mixing, and after 15 seconds or more had passed, the oxidation-reduction potential stabilized at about 550 mV. In Example 10, the oxidation-reduction potential prior to mixing was 400 mV or less, but this value gradually increase after mixing, and after 15 seconds or more had passed, the oxidation-reduction potential stabilized at about 550 mV.

As described above, in the mixtures of both Examples 9 and 10, the oxidation-reduction potential stabilized at about 550 mV, although in Example 9, a higher oxidation-reduction potential was maintained until about 15 seconds after mixing. Accordingly, in those cases where iodide ions are injected following the injection of hypochlorous acid, the injection point for the iodide ions is preferably set such that the time taken for the iodide ions to reach the reverse osmosis membrane is at least 15 seconds. In those cases where the sodium hypochlorite is injected following the injection of the iodide ions, there are no particular limitations on the location settings for the injection points.

REFERENCE SIGNS LIST

1: Water treatment device
10: Water to be treated tank
12: Membrane filtration device
14: Reverse osmosis membrane device
16: Pump
18, 20: Water to be treated line
22: Membrane filtration treated water line
24: Permeate line
26: Concentrate line
28: Addition line
30: Reducing agent addition line

The invention claimed is:

1. A water treatment method comprising treating a water to be treated using a reverse osmosis membrane to obtain a concentrate and a permeate, the method comprising either:

adding, to a water to be treated containing at least one of hypochlorous acid, hypobromous acid, and salts of these acids, at least 1 mol of iodide ions per 1 mol of a free chlorine content and free bromine content in the water to be treated with the proviso that a free iodine CT value, represented by a free iodine concentration (mg/L) produced in the water to be treated containing the added iodide ions×an iodide ion addition time (h), is not more than 1.25 (mg/L·h), or adding, to a water to be treated containing iodide ions, at least one of hypochlorous acid, hypobromous acid, and salts of these acids in such an amount that a free chlorine content and free bromine content does not reach more than 1 mol per 1 mol of iodide ions in the water to be treated and with the proviso that a free iodine CT value, represented by a free iodine concentration (mg/L) produced in the water to be treated to which at least one of the chlorine-based oxidizing agent and the bromine-based oxidizing agent has been added×an addition time (h) for at least one of the chlorine-based oxidizing agent and the bromine-based oxidizing agent, is not more than 1.25 (mg/L·h).

2. The water treatment method according to claim 1, wherein in a case where the iodide ions are added to the water to be treated containing at least one of the chlorine-based oxidizing agent and the bromine-based oxidizing agent, a time from addition of the iodide ions until reaching the reverse osmosis membrane is set to at least 15 seconds.

3. A water treatment method comprising subjecting a water to be treated to a membrane filtration treatment using a separation membrane, and treating a membrane filtration treated water obtained during the membrane filtration treatment using a reverse osmosis membrane to obtain a concentrate and a permeate, the method comprising either:

adding, to the water to be treated containing at least one of hypochlorous acid, hypobromous acid, and salts of these acids, at least 1 mol of iodide ions per 1 mol of a free chlorine content and free bromine content in the water to be treated with the proviso that a free iodine CT value, represented by a free iodine concentration (mg/L) produced in the water to be treated containing the added iodide ions×an iodide ion addition time (h), is not more than 1.25 (mg/L·h), or adding, to the water to be treated containing iodide ions, at least one of hypochlorous acid, hypobromous acid, and salts of these acids in such an amount that a free chlorine content and free bromine content does not reach more than 1 mol per 1 mol of the iodide ions in the water to be treated and with the proviso that a free iodine CT value, represented by a free iodine concentration (mg/L) produced in the water to be treated to which at least one of the chlorine-based oxidizing agent and the bromine-based oxidizing agent has been added×an addition time (h) for at least one of the chlorine-based oxidizing agent and the bromine-based oxidizing agent, is not more than 1.25 (mg/L·h).

4. The water treatment method according to claim 3, wherein in a case where the iodide ions are added to the water to be treated containing at least one of the chlorine-based oxidizing agent and the bromine-based oxidizing agent, a time from addition of the iodide ions until reaching the reverse osmosis membrane is set to at least 15 seconds.

5. The water treatment method according to claim 1, wherein in a case where the iodide ions are added to the water to be treated containing at least one of the chlorine-based oxidizing agent and the bromine-based oxidizing agent, a region from a location of addition of the iodide ions through to the reverse osmosis membrane is operated as a closed system.

6. The water treatment method according to claim 1, wherein in a case where the iodide ions are added to the water to be treated containing at least one of the chlorine-based oxidizing agent and the bromine-based oxidizing agent, an amount added of the iodide ions is controlled so that an oxidation-reduction potential of the water to be treated following addition of the iodide ions is not more than 550 mV.

7. The water treatment method according to claim 3, wherein in a case where the iodide ions are added to the water to be treated containing at least one of the chlorine-based oxidizing agent and the bromine-based oxidizing agent, a region from a location of addition of the iodide ions through to the reverse osmosis membrane is operated as a closed system.

8. The water treatment method according to claim 3, wherein in a case where the iodide ions are added to the water to be treated containing at least one of the chlorine-based oxidizing agent and the bromine-based oxidizing agent, an amount added of the iodide ions is controlled so that an oxidation-reduction potential of the water to be treated following addition of the iodide ions is not more than 550 mV.

* * * * *